No. 655,650. Patented Aug. 7, 1900.
W. W. DIXON.
BUTTONHOLE SEWING AND CUTTING MACHINE.
(Application filed June 23, 1897.)
(No Model.) 4 Sheets—Sheet 1.
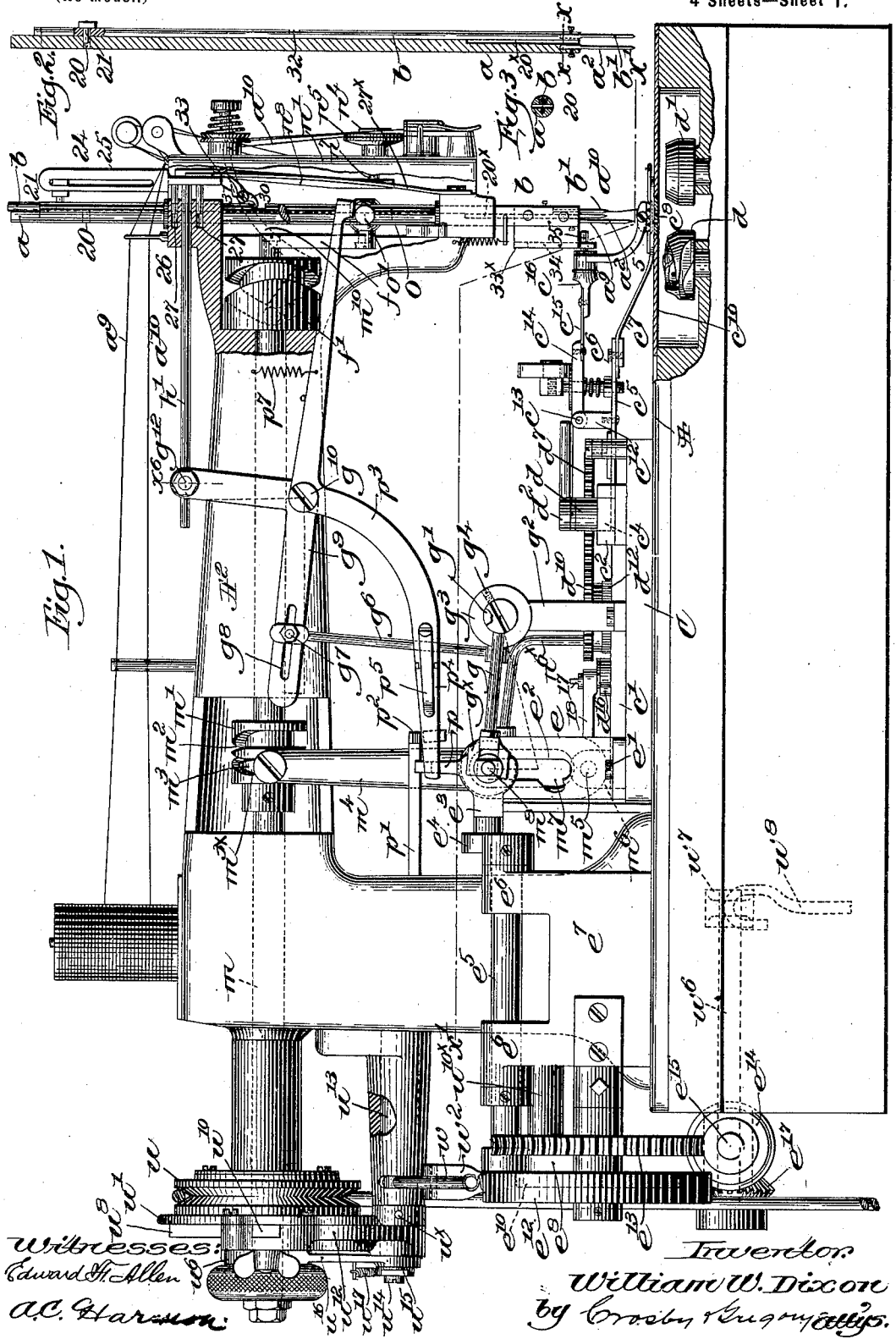
Witnesses:
Edward F. Allen
A. C. Harrison
Inventor:
William W. Dixon
by Crosby & Gregory attys.

No. 655,650. Patented Aug. 7, 1900.
W. W. DIXON.
BUTTONHOLE SEWING AND CUTTING MACHINE.
(Application filed June 23, 1897.)
(No Model.) 4 Sheets—Sheet 2.
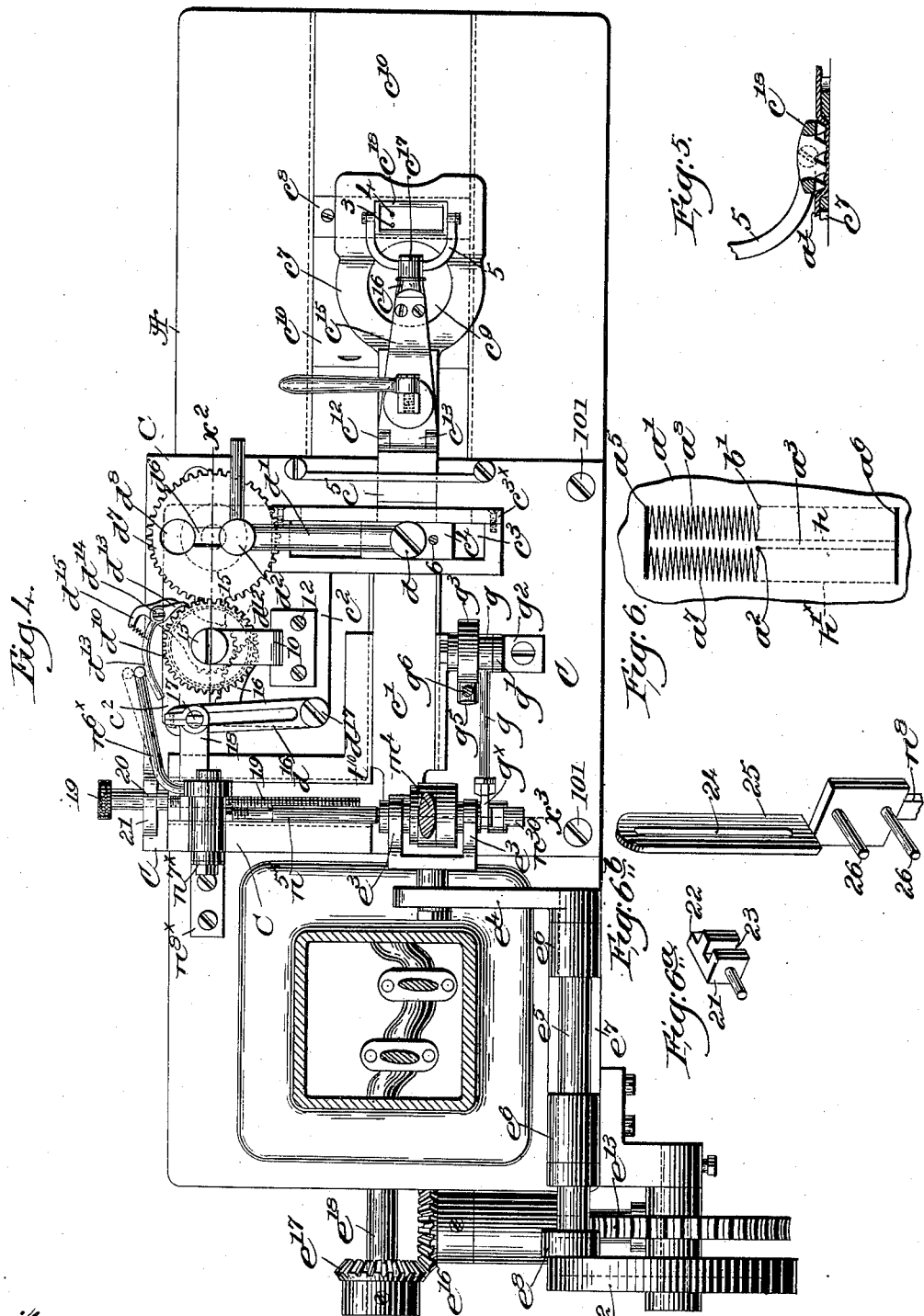
Witnesses.
Edward F. Allen.
A. C. Harmon.
Inventor
William W. Dixon
by Crosby & Gregory
Attys.
THE NORRIS PETERS CO., PHOTO-LITHO., WASHINGTON, D. C.

No. 655,650. Patented Aug. 7, 1900.
W. W. DIXON.
BUTTONHOLE SEWING AND CUTTING MACHINE.
(Application filed June 23, 1897.)
(No Model.) 4 Sheets—Sheet 3.
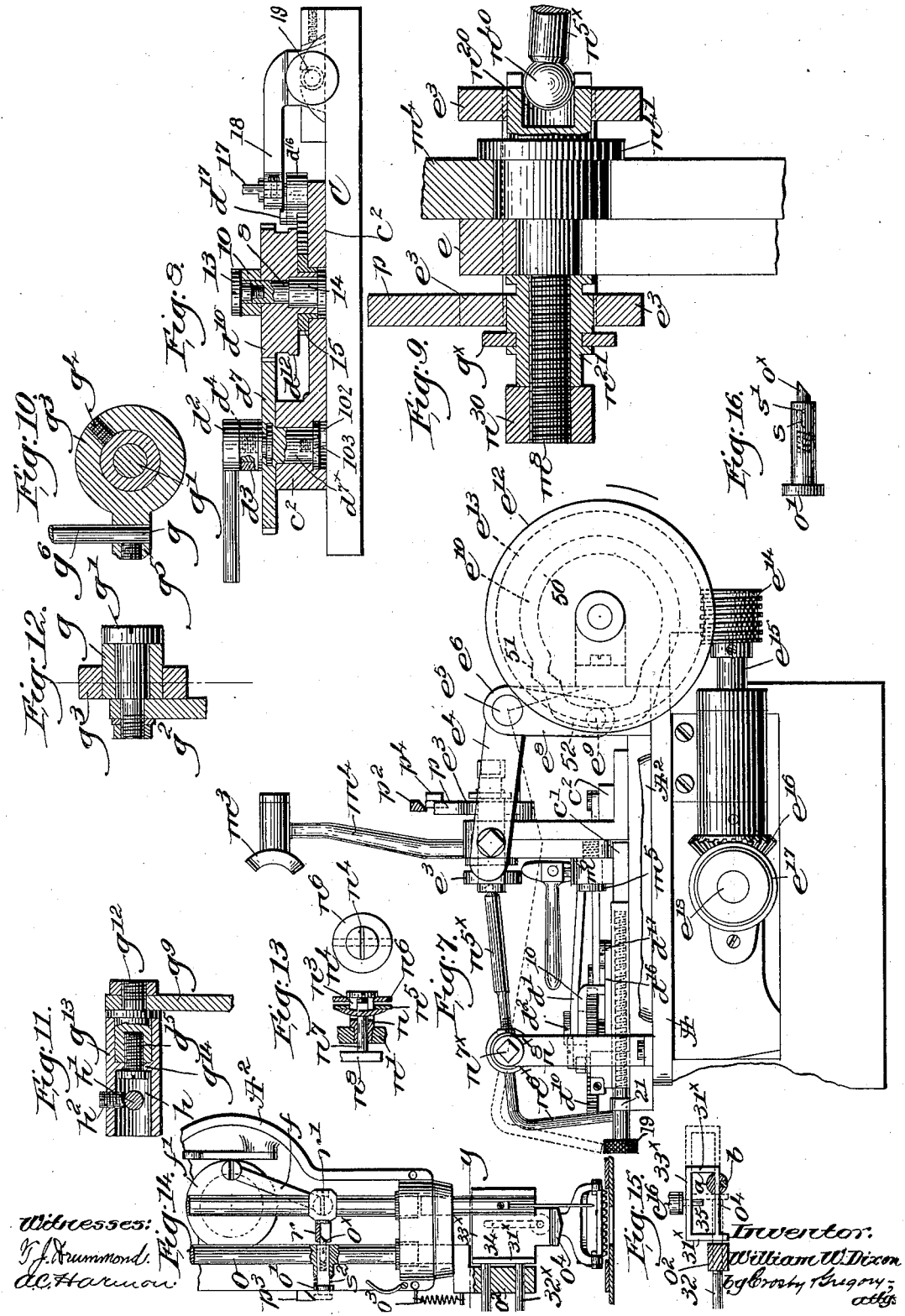

No. 655,650. Patented Aug. 7, 1900.
W. W. DIXON.
BUTTONHOLE SEWING AND CUTTING MACHINE.
(Application filed June 23, 1897.)
(No Model.) 4 Sheets—Sheet 4.
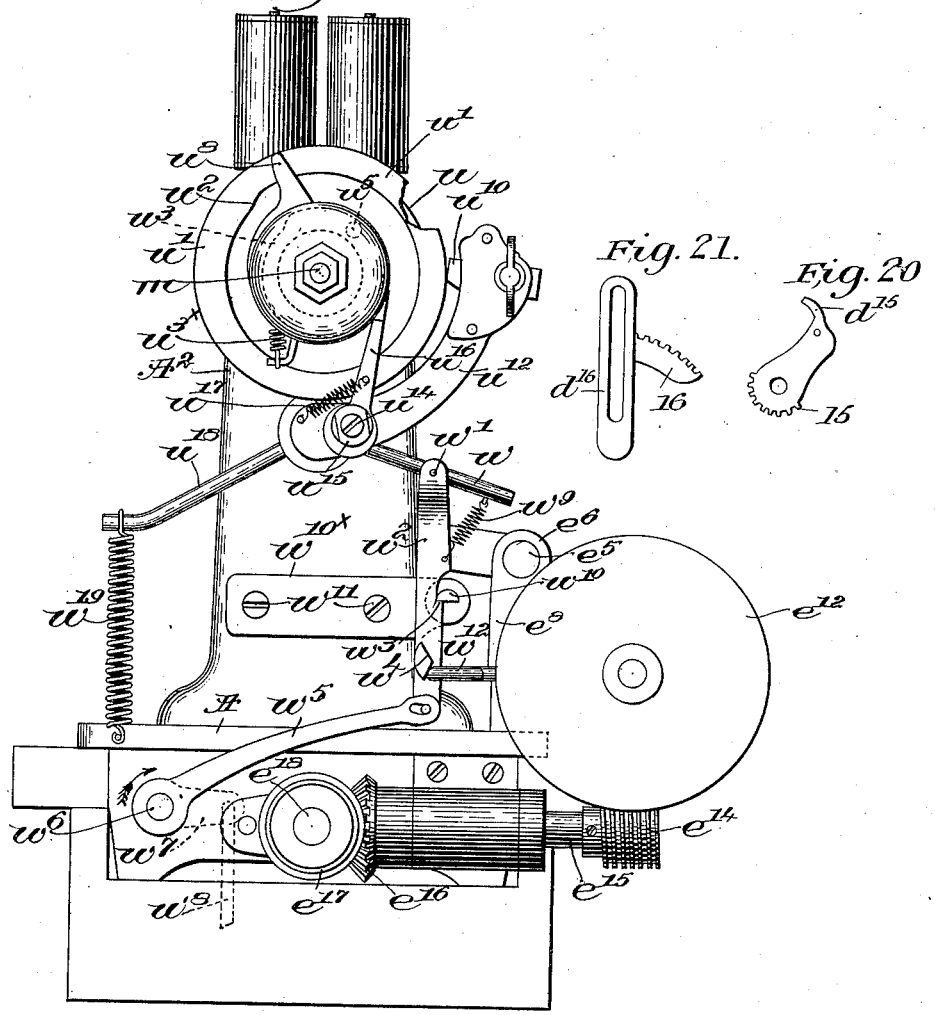
Witnesses
Edward F. Allen.
A. C. Harmon.
Inventor:
William W. Dixon
by Crosby & Gregory
attys.

UNITED STATES PATENT OFFICE.

WILLIAM W. DIXON, OF BOSTON, MASSACHUSETTS, ASSIGNOR TO THE REECE BUTTON HOLE MACHINE COMPANY, OF PORTLAND, MAINE.

BUTTONHOLE SEWING AND CUTTING MACHINE.

SPECIFICATION forming part of Letters Patent No. 655,650, dated August 7, 1900.

Application filed June 23, 1897. Serial No. 641,893. (No model.)

*To all whom it may concern:*

Be it known that I, WILLIAM W. DIXON, of Boston, county of Suffolk, State of Massachusetts, have invented an Improvement in Buttonhole-Stitching Machines, of which the following description, in connection with the accompanying drawings, is a specification, like characters on the drawings representing like parts.

In buttonhole-stitching machines now commonly in use the material in which the buttonhole is to be worked by stitches is held in a work holder or clamp and either the clamp is moved laterally or the needle-bar is moved laterally for the production of the depth and overedge stitch, and commonly one side of the buttonhole is stitched complete and then the other side is stitched, such method of stitching requiring two complete movements of the work-holder longitudinally or in the direction of length of the buttonhole for a distance equal to the length of buttonhole it is desired to make. The movement in one direction enables the depth and overedge stitch to be made along one side and the reverse movement along the opposite side of the buttonhole. So, also, overedge-stitches have been made simultaneously at opposite sides of a buttonhole-slit; but the machine described for such stitching did not bar the end of the buttonhole.

In my studies to improve buttonhole-stitching machines I employ a machine having two needles each having coöperating with it a suitable under or second thread-carrier, and these two needles act to make the depth and overedge stitch for both sides of the buttonhole during one feeding movement of the work holder or clamp, and the machine also has been devised to make barring-stitches preparatory to commencing the two lines of depth and overedge stitching, and also preferably after the completion of said two lines of depth and overedge stitching, if it be desired to bar both ends of the buttonhole, the machine operating to stitch and bar a buttonhole automatically by one continued operation.

The machine herein to be described as embodying my invention in one practical form has two eye-pointed thread-carrying needles, and each needle is connected with and carried by its own needle-bar, one of said bars in the form in which my invention is herein shown being fitted to slide within the other bar and being operated at times by the other through a coupling mechanism or coupling. These two needle-bars when the depth and overedge stitches are being made are moved in unison, and each needle passes through the material; but when the barring of the ends of the buttonhole is being done one of these needles, which may be called the "secondary" needle, is put temporarily in its inoperative position and the other or "main" needle, as it may be called, is employed alone to make the bar-stitch, and while this barring is being done the length of the depth-stitch movement is preferably increased, so as to make the bar-stitches substantially twice as long as the usual distance between the overedge and depth stitches between the two bars. These barring-stitches may be, however, of any desired length and number, and one will preferably be superimposed on the other, the longitudinal or feeding movement of the work or the movement to enable stitching to take place in the direction of the length of the buttonhole being at such time suspended, or substantially so. When the secondary needle is thrown out of operation, its thread has to be clamped and controlled between the needle and the take-up to thereby prevent any liability of the thread fouling under the main needle, which continues to operate in making a bar.

The buttonhole herein to be made must be cut, and this may and preferably will be done after barring one end and the completion of the depth and overedge stitches at both sides of what is to be the slit, the cutting preferably taking place preparatory to barring the last end of the buttonhole to be barred.

Figure 1, in elevation partially broken out, shows the rear side of a buttonhole-stitching machine embodying my invention. Fig. 2 is a longitudinal section of the main needle-bar, showing the secondary bar within it and the coupling to unite them when desired, as will be described. Fig. 3 is a section taken through the two needle-bars, Fig. 2, in the line *x*. Fig. 4 is a section below the dotted line $x'$ of Fig. 1. Fig. 5 is an enlarged detail in cross-section of the work holder or clamp. Fig. 6 is an enlarged detail showing the method of making a buttonhole in accordance with my invention. Fig. $6^a$ shows one form of coupling for uniting the secondary and main needle-bars detached; Fig. $6^b$, a detail showing the device carrying the coupling device to couple together the needle-bars. Fig. 7 is an end view of the machine looking at it from the left, Fig. 1, the uprights supporting the overhanging arm being broken off. Fig. 8 is a section in the line $x^2$ Fig. 4. Fig. 9 is a section in the dotted line $x^3$ of Fig. 4. Fig. 10 is a detail showing in section the collar, to which is attached the link $g^6$. Fig. 11 is a sectional detail in the line $x^6$, Fig. 1. Fig. 12 shows in section the collar $g^3$ and the stud on which it is mounted. Fig. 13 shows in front elevation and plan the auxiliary controller for the secondary-needle thread. Fig. 14 is a detail front elevation partially broken out chiefly to represent the cutting mechanism, and Fig. 15 is a section below the line $y$ of Fig. 14. Fig. 16 shows the dog of the cutter-carrier removed and enlarged. Fig. 17, an end view of the machine, chiefly to show the starting and stopping mechanism. Fig. 18 shows the cam-ring and pulley in face view; Fig. 19, a detail to be referred to. Fig. 20 is a detail showing the pawl-carrier $d^{15}$ detached; and Fig. 21 shows the lever $d^{16}$, with its sector 16 detached.

The bed-plate A, having the overhanging arm $A^2$, carrying the main-needle-bar-actuating shaft $m$, the take-up $m^{10}$, (shown by dotted lines in Fig. 1,) the cam fast on the shaft $m$ for operating it, the hooks $d\ d'$, forming complementary stitch-forming mechanism cooperating with the two needles to be described, said hooks containing thread-cases provided with under or second threads, and the means for rotating the said hook are and may be all as common to United States Patent No. 578,136, dated March 2, 1897. The machine upon which I have chosen to illustrate this my invention represents a well-known form of machine made by The Wheeler & Wilson Manufacturing Company and used for stitching two parallel seams; but instead of the two under-thread-carrying mechanisms above referred to I may substitute any other two usual under-thread-carrying mechanisms—as, for instance, such as shown in United States Patent No. 161,087, dated March 23, 1875. In said Patent No. 578,136 one needle-bar carries two needles; but herein the needle-bar $a$, which I will in this description sometimes designate as a "main" needle-bar and which is operated by means the same as that employed to reciprocate the needle-bar in said patented machine, is shown as grooved longitudinally to receive within it a secondary needle-bar $b$.

The needle-bar $a$ has an attached eye-pointed needle $a^2$, and the secondary needle-bar $b$ has an eye-pointed needle $b'$.

To enable the object and purpose of my invention to be more readily understood, I will first refer to Fig. 6, which represents in diagram a buttonhole stitched in accordance with my invention. In that figure let $a'$ represent the material; $a^3$, the line of the buttonhole-slip in the material; $a^5\ a^6$, the bar-stitches, and $a^7\ a^8$ the depth-stitches or the stitches which are made through the material back from the edge of the buttonhole. The stitches in Fig. 6 are represented as widely separated in order to better show the appearance of the stitch, and the space between the overedge-stitches at one and at the other side of what is to be the buttonhole-slit is also enlarged for the sake of this description; but in practice the overedge-stitches will come substantially to the line $a^3$, leaving just room enough, if desired, to cut the buttonhole after it is worked, or it may be cut, if desired, before it is worked and while held in the work-holder, all in the usual manner. In the diagram the stitches $a^5$, a plurality of them, preferably four, are first made in the material by the needle $a^2$, the secondary needle $b'$ at such time occupying its inoperative or abnormal position, as represented in Fig. 1, and these bar-stitches may be, as shown, of a length to cross the line $a^3$, they being preferably substantially twice as long as the distance between the overedge and depth stitches. The bar-stitches having been made, and in practice they will preferably be superimposed one on the other, the secondary needle is put automatically into the position, Fig. 2, where the eyes of both of the needles stand in substantially the same horizontal plane in operative position, and thereafter while the two needles are in such position their needle-bars will be reciprocated, so that said needles, with their independent threads $a^9\ a^{10}$, will stitch at each descent each at its own side of said center line $a^3$, each needle descending at one thrust through the material in substantially the said center line or close to it to make the stitch which will be exposed at the edge of the buttonhole, and at its next descent it will pass through the material back from said center line equal to the width required, and this stitching will be continued by a change in the relative position of the work-holder or cloth-clamp and the needles until the buttonhole has been worked for the desired length, the work-holder in the meantime being moved longitudinally or in the direction of the length of the buttonhole, and this length having been determined the secondary needle is again temporarily automatically put out of position, while the main needle $a^2$ continues to stitch, the length of movement for bar-stitching being again automatically increased until said needle has made the desired number of stitches predetermined to constitute the bar, preferably four stitches, but it may be more or less. At this position of the operative parts the machine may be stopped automatically and the material containing the buttonhole barred at both ends may be removed from the work-holder and the material be again put into the work-holder to make another buttonhole, and at the reverse movement of the work-holder another buttonhole will be made and barred.

The material $a'$ is herein represented as adapted to be held in a work holder or clamp, which I will now describe. To the work-supporting plate A of the machine I attach by suitable screws a bed-plate C, provided with a guiding groove or way in which is placed the end $c'$ of a slide $c^2$, provided at its end nearest the stitch-forming mechanism with a cross or transverse slot $c^3$, said slot receiving in it loosely a block $c^4$, connected with a bar $c^5$, having attached to it, as by a screw $c^6$, a spring-plate $c^7$, resting on the usual needle-plate $c^8$, it being provided with two needle-holes 3 4, one for the needle $a^3$ and the other for the needle $b'$, they passing through said holes in order to present the threads carried by them to the points of the hooks $d$ $d'$. The spring-plate $c^7$ is provided with an opening $c^9$, (see Fig. 4,) through which to readily gain access to the bobbin-case in the hook $d$ when the usual cover-plate $c^{10}$ has been withdrawn. The bar $c^5$ also has erected upon it a stand $c^{12}$, having jointed to it at $c^{13}$ an arm $c^{14}$, to which is attached a spring-arm $c^{15}$, said spring-arm carrying a rigid arm $c^{16}$, threaded for the reception of a stud-screw $c^{17}$, on which is mounted a fork 5, having journaled in its end a rocking open-centered foot $c^{18}$, preferably toothed at its under side and bearing directly upon the material $a'$, (see Fig. 5,) said foot pressing the material in which the buttonhole is to be stitched into the space in the spring-plate $c^7$ and directly upon the needle-throat plate. The left-hand end of the bar $c^5$ (see Figs. 1 and 4) is extended through a slot, represented by dotted lines at the under side of the detachable plate $c^{3\times}$, forming one side of the slot $c^3$, and the end of said bar is attached to the block $c^4$ by suitable screws, as 6, one of which is shown in Fig. 4. To impart to this work-holder its "longitudinal movement," which term I have used herein to designate that movement of the work-holder in the direction of the length of the buttonhole, I employ the following means: The block $c^4$ is threaded to receive a stud-screw $d$, which is passed through a hole in one end of a link $d'$, the opposite end of the said link surrounding loosely the neck $d^3$ (see Fig. 8) of a handle-post $d^2$, said neck being threaded interiorly to receive a screw $d^4$, the sides of the head of said screw being slabbed to fit the walls of the diametrical groove $d^6$ of a toothed gear $d^7$, having its hub $d^{7\times}$ entered in a hole in a part of the slide $c^2$ beyond the slot $c^3$, said hub being held down in said slide by a suitable screw 102 and a washer 103. The groove $d^6$ is enlarged at one end, as at $d^8$, to permit the entrance of the head of the screw $d^4$. By turning the handle-post the point of connection of the neck, which constitutes a crank-pin, with relation to the center of said toothed gear $d^7$ may be readily adjusted to correspond with the length of buttonhole to be made, for the greater the distance of the said crank-pin from the center of rotation of said toothed wheel the longer the buttonhole, and vice versa. This toothed wheel derives its motion from a pinion $d^{10}$, mounted on a stud 8, (see Fig. 8,) carried by the plate $c^2$, the upper end of said stud entering a hole in and being steadied by a bracket 10, secured to the said movable plate $c^2$ by screws 12. A stud-screw 13 enters said stud 8 and its head overlaps the bracket. The pinion $d^{10}$ has secured to or made as a part of it a ratchet-wheel $d^{12}$, which is engaged by a pawl $d^{13}$, pivoted at $d^{14}$ on a pawl-carrier $d^{15}$, said pawl-carrier having a hole in its end which, as herein shown, surrounds the sleeve-like hub 14 of the combined pinion and ratchet-wheel, the circular inner end of said pawl-carrier (see Fig. 20) having a series of teeth 15, (shown by dotted lines, Fig. 4, and in full lines, Fig. 8,) said teeth being engaged by the teeth of a sector 16, (shown separately in Fig. 21, and also by dotted lines in Fig. 4,) extended from one side of a slotted lever $d^{16}$, pivoted at $d^{17}$ upon the said sliding plate $c^2$, the slot of the said lever $d^{16}$ receiving in it loosely a stud 17, carried by and extended down thereinto from an arm 18, having a threaded foot of dovetail shape in cross-section, it entering a dovetailed guiding-groove $t^{10}$, made in the fixed plate C, said threaded foot being entered by a screw 19, having a head provided with an annular groove 20, said groove being entered by a notched ear 21, rising from the said plate C, the said screw being free to be rotated but not to slide with relation to the said plate C, the rotation of said screw by hand causing the arm 18 to be moved, thus moving the stud 17 longitudinally in the slot of the lever $d^{16}$. The rotation of the screw in one or the other direction controls the spacing of one stitch from another in the direction of the length of the buttonhole.

The plate $c^2$ and the work-holder herein shown derive their movement parallel to the overhanging arm and at right angles to the length of the buttonhole-slit to make what are herein designated as the "depth" and "overedge" stitches by or through devices one form of which I will now describe, and in such movement the work-holder is so actuated as to space the depth and overedge stitches.

The main shaft $m$ has fast on it a hub $m'$, provided with a crossing-groove $m^2$, in which is placed a shoe $m^3$, loosely held by a stud $m^{3\times}$ in the upper end of a lever $m^4$, jointed at its lower end to a stud $m^5$, projected from an ear $m^6$, rising from the inner end $c'$ of the slide $c^2$, said lever being slotted, as at $m^7$, to embrace an adjustable fulcrum $m^8$, so that according to the position of said fulcrum in the slot of said lever the said lever, having its upper end moved a uniform distance at each rotation of the main shaft, will have its lower or short arms and the connected slide $c^2$ moved for a greater or less distance, that depending upon the length of throw desired for the work-holder to effect the depth and over-edge stitch movement, the said depth-stitch movement being increased in length, as stated, for barring. As the plate $c^2$ is moved to the right (viewing Fig. 4) by the lever $m^4$ the gears $d^7 d^{10}$ are also moved and with them the pawl-carrier $d^{15}$, its pawl $d^{13}$ being then in engagement with the ratchet-teeth $d^{12}$ of the gear $d^{10}$, and during this movement, owing to the fact that the teeth 15 of said pawl-carrier $d^{15}$ are in engagement with the teeth of the sector 16, extended from the lever $d^{16}$, then held stationary by the arm 18 and its stud 17, the said pawl-carrier is rotated about the hub of the gear $d^{10}$, causing the pawl $d^{13}$, in engagement with the ratchet-teeth $d^{12}$, to turn said toothed gear $d^{10}$ and with it the gear $d^7$, the extent of this rotation being governed, it will be understood, by the position of the stud 17 in the slot of the lever $d^{16}$, for the nearer the said stud to the pin $d^{17}$, connecting said lever to the movable or sliding plate $c^2$, the less the movement of the pin $d^{10}$, and vice versa.

The bed-plate C has erected upon it a stand $e$, said stand being fixed in position by a screw $e'$, and this stand is slotted at $e^2$ and receives in it the said fulcrum $m^8$, the devices for raising and lowering this fulcrum being, as herein shown, arranged outside of the stand and opposite the lever $m^4$. The devices for raising and lowering this fulcrum automatically may be a fork $e^3$, carried by an arm $e^4$ of a rock-shaft $e^5$, mounted in bearings $e^6$ of a stand $e^7$, erected upon the bed A of the frame, said rock-shaft having, as herein shown, at its outer end an arm $e^8$, provided with a roller or other stud $e^9$, (see Fig. 7,) which enters a cam-groove $e^{10}$ in a rotating controlling or cam wheel $e^{12}$, said cam-wheel having alongside of it a gear $e^{13}$, having its periphery provided with teeth cut to be engaged by the teeth of a worm $e^{14}$ on a shaft $e^{15}$, herein represented as provided with a beveled pinion $e^{16}$, which is engaged and rotated by a bevel-pinion $e^{17}$ on the usual under or lower shaft $e^{18}$, said shaft being employed in usual manner to actuate the shafts carrying the hooks $d d'$—as, for instance, in the manner of the well-known Wheeler & Wilson sewing-machine.

As I have chosen to illustrate my invention the relative change of position of the material in which the buttonhole is being stitched and the needle is effected entirely through the work-holder; but it will be remembered that it is common in buttonhole-stitching machines to move the needle backward and forward for the production of the depth-stitch, so that this invention to be described is not limited to moving position of the material for the depth-stitch.

The main needle-bar $a$ has in it a hole 20, (see Fig. 2, and dotted lines, Fig. 1,) and the secondary needle-bar has mounted loosely in it a movable coupling 21, shown as a pin having a head 22, provided with a groove 23, (see Fig. 6ª,) said head entering a slot 24 in a movable stand 25, said stand having at its lower end a plurality of pins, as 26, which enter loosely suitable holes 27 in the head of the machine. This stand, when depth and over-edge stitching are being done, is acted upon by a suitable spring, as $27^\times$, which presses the base of the stand firmly against the head and at the same time causes the coupling 21 to enter the hole 20 in the main needle-bar as it is reciprocated in the usual manner by or through the link $f$, connecting a collar on said bar with a crank-pin secured to the front end of the take-up-cam-operating hub $f'$, and reciprocates the secondary needle-bar $b$ with it, causing both needles to penetrate the material; but when barring is to be done and the distance between the overedge and depth stitches is to be altered and increased to make the bar, for which operation the fulcrum $m^8$ must be raised, the raising of said fulcrum causing the arm $g$, forked to embrace a part of said fulcrum and connected at its opposite end to a sleeve mounted loosely on a stud-screw $g'$, supported on a stand $g^2$ to be moved. This sleeve has mounted upon it a collar $g^3$, the collar being made adjustable on the sleeve by a set-screw $g^4$. This collar has an ear $g^5$, (see the sectional detail Fig. 10,) which receives one end of a link $g^6$, provided at its upper end with a stud $g^7$, which is adjustable in a slot $g^8$ of a lever $g^9$, herein shown as an elbow-lever pivoted at $g^{10}$ on the overhanging arm of the machine, the opposite end of said elbow-lever having a stud-screw $g^{12}$ tapped at its opposite end, (see Fig. 11,) the said screw receiving over it loosely a sleeve $g^{13}$, having at its interior a web, as $g^{14}$, a screw $g^{15}$, entering a hole in this web loosely, being screwed into the tapped hole in the stud $g^{12}$, so that said sleeve is free to turn loosely on said stud-screw as the lever $g^9$ is moved backward and forward. This sleeve also has a hole $h$, which receives in it one end of a rod $h'$, and said rod is made adjustable in said sleeve by or through a set-screw $h^2$, the free or right-hand end of said rod (see Fig. 1) after passing through a suitable hole in the head of the machine acting against the lower end of the stand 25 to push said stand away from said head and in opposition to the spring 27. The pushing of this stand to the right, viewing Fig. 1, causes it to withdraw from the bar $a$ the coupling 21, carried by the secondary needle-bar, this being always done when the main needle-bar is in its highest position. The uncoupling movement described for this stand causes its lower end to act on the tail of a pawl 30, pivoted at 31, forcing the acting end of said pawl quickly into a notch, as 32, in the secondary needle-bar, thus locking said bar in its abnormal or inoperative position, it remaining so locked while the main needle-bar $a$ is reciprocated to make the bar-stitches, these bar-stitches being made, it will be remembered, only when the fulcrum $m^8$ is elevated. The pawl 30 is normally acted upon by a spring 33, (partially shown in Fig. 1,) said spring when permitted to do so by the movement of the stand 25 to the left in Fig. 1 to couple the secondary needle-bar with the main needle-bar acting to instantly withdraw the pawl 30 from the notch 32 and let the secondary needle-bar move in unison with the main needle-bar.

Referring again to the diagram Fig. 6, I have therein shown the main and the secondary needles $a^2$ $b'$. The main needle occupies, as shown in the diagram Fig. 6, a position substantially at the line of slit of the buttonhole, where it makes the overedge-stitch, and the secondary needle occupies its depth-stitch position at the other side of what is to be the buttonhole-slit; but at the next descent of the said needles the needle $b'$ will descend in the line $h$ to make an overedge-stitch and the needle $a^2$ will descend in the line $h'$ to make a depth-stitch, these needles changing their positions from the line of slit of the buttonhole or the overedge-stitch line to the depth-stitch line alternately, each needle working the overedge and depth stitches for one-half of the buttonhole, each completing one edge of the buttonhole as the material is being fed longitudinally or in the direction of the length of the buttonhole, so that at each complete movement of the material longitudinally in one and in the opposite direction a buttonhole is completed.

In Fig. 6 I have omitted part of the depth and overedge stitches; but I have shown the second or final barring $a^6$, and it will be understood that the buttonhole may by the mechanism herein described be barred at one end before the stitching of the depth and overedge stitches, and at its other end after the completion of the stitching of the depth and overedge stitches.

The fulcrum $m^8$ is shown as detached in Fig. 9, and in said figure, as well as in Figs. 4 and 7, it will be seen that the fork or fulcrum controller $e^3$ is made yoke-shaped or double and that said fork spans not only the lever $m^4$, but also the stand $e$, such shaped fork acting in a superior manner to lift the fulcrum squarely and without any liability of its binding.

The fulcrum $m^8$, made as a stud, has a chamber $n^{20}$ at one end, and beyond said chamber it has a collar $n^{41}$, which rests against the lever $m^4$, and at the outer or left-hand end of the stand $e$ the fulcrum has screwed upon its threaded portion a collar $n^{21}$, said collar being provided with an annular groove to receive the forked end $g^\times$ of the arm $g$, and this collar is acted upon by a set-nut, as $n^{30}$, said nut acting as a check-nut for the collar. The chamber $n^{20}$ at the end of this fulcrum-stud receives the ball-like end $n^{40}$ of an elbow-lever $n^{5\times}$ $n^{6\times}$, Fig. 7, mounted to turn freely on a stud $n^{7\times}$, erected in a stand $n^{8\times}$, fixed on the bed A of the machine.

When the barring is being done, the longitudinal or feeding movement or the movement of the material in the direction of the length of the buttonhole is to be stopped as the fulcrum $m^8$ is lifted preparatory to making the bar-stitches. The said fulcrum also moves the lever $n^{5\times}$, causing its end $n^{6\times}$ to act upon the tail of the pawl $d^{13}$, thereby removing said pawl from engagement with the ratchet-teeth $d^{12}$ and suspending the further rotation of the said pinion $d^{10}$ and tooth-wheel $d^7$ while the barring is being effected; but as soon as the fulcrum is lowered and the secondary needle-bar is coupled to the main needle-bar preparatory to making the stitches for finishing the buttonhole-slit such movement causes the arm $n^{6\times}$ of the lever to retire from the tail of said pawl and let the pawl immediately commence to actuate the ratchet-wheel and gear to impart to the work-holder its longitudinal movement required to feed material in the direction of the length of the buttonhole.

In the machine herein described the threads employed will be subjected to the action of any usual or suitable tension devices and slack-thread controller—such, for instance, as common to the said Wheeler & Wilson machine—and preferably the thread $a^{10}$, supplying the secondary needle, will have coöperating with it an auxiliary clamp or thread-controller which will temporarily come into operation when the secondary needle-bar is uncoupled from the main needle-bar to be left in its inoperative or abnormal position, said auxiliary controller at such times clamping and holding the slack in the thread $a^{10}$, so that it shall not by any means foul on the cloth under the point to the main needle $a^2$. In Fig. 13 I have shown a detail of one form of this auxiliary thread-controller, which I will now refer to. This thread-controller is composed of a hollow stud-screw $n$, screwed into the removable cap $n'$, covering the needle-bar and head of the machine, said stud-screw being slotted, as at $n^3$, and threaded interiorly for a short distance to receive a screw $n^4$. This hollow stud-screw has applied to it two disks $n^5$ $n^6$, the one $n^6$ resting at its outer side against the head of the screw $n^4$, the other disk being acted upon by a rod $n^7$, extended through the hollow stud-screw, leaving its end exposed to be acted upon by a projection $n^8$, (shown best in Fig. 1,) attached to and depending from the lower end of the stand or coupling carrier or actuator 25, said projection $n^8$, when the said carrier is moved to the right, viewing Fig. 1, to uncouple the secondary needle-bar from the main needle-bar and leave it at rest in its inoperative position, acting on the said rod, causing it to force the disk $n^5$ against the thread lying between it and the disk $n^6$, such movement clamping the secondary needle-thread and preventing it from fouling at and below the main needle. This needle-thread is unclamped immediately and left free when the coupling-actuator 25 is again moved by or through its spring to unite the secondary and main needle bars for depth and overedge stitching.

The slit for the stitched buttonhole herein described will preferably be made after the bar at one end and the depth and overedge stitches to constitute the two sides of the buttonhole have been finished, or substantially so, and preparatory to making the second bar; but this invention is not herein limited to the exact point or time at which the slit shall be cut, as it is obvious that only by the exercise of mechanical skill the cutting mechanism might be variously modified. The cutting mechanism herein shown has been specially adapted for this novel sewing-machine, and it will now be described. In place of the usual presser-foot bar I have mounted a cutter-carrier bar $o$, it having, as herein shown, (see Fig. 14,) a movable dog $o'$, the head of which is exposed at the side of the head of the machine, the lower end of the bar having a block $o^2$, provided, as herein shown, with two holes, a spring $o^3$ normally acting to keep the said carrier in its elevated position. The dog $o'$ (see Figs. 14 and 16) is shown as made hollow for part of its length to receive a pin $o^\times$, having a beveled end, said dog being slotted at $s$ to receive a pin $s'$, a spring in the hollow of the dog acting against said pin to normally keep the beveled end out of the dog. This dog is surrounded by a spring $s^2$, which acts normally to pull the pin end of the dog out of the path of movement of the projection $r$, carried by the main needle-bar. The needle-bar $a$ is slotted, as shown in $20^\times$, (see Figs. 1, 2, and 15,) to receive a thin blade or cutter $o^4$, shown as of quadrilateral shape, the two ends $31^\times$ of the quadrilateral-shaped cutter enabling a very thin blade to be used. This blade has attached to one of its ends two like pins $32^\times$, which extend through the holes in the head $o^2$ of the carrier-bar $o$, and the inner or rear side $33^\times$ of this quadrilateral cutter is slotted, as shown by dotted lines 34, said slot receiving a pin 35 at the end of the rigid portion $c^{16}$, carrying the foot of the work-holder, said projection standing in said slot 34 causing the cutter to travel longitudinally back and forth in the slot of the needle-bar in the direction of the length of the buttonhole with the work-holder, said slot 34 being long enough to also permit the cutter to rise and fall at proper times. The wheel $e^{12}$ constitutes what I shall in the claims designate as the "controlling-wheel," as it controls the time at which the barring shall take place and also the cutting of the buttonhole, and it may also control the time of stopping the buttonhole when the second bar is made and finished. I shall also designate herein the yoke $e^3$ as the "fulcrum-controller," for the reason that it in its movements varies the position of the fulcrum $m^8$ to not only make the stitch longer from what is to be the slit of the buttonhole or shorter as may be desired and as has been hereinbefore described, but also to uncouple the secondary needle-bar from the main needle-bar. This fulcrum-controller $e^3$ has been provided with an upright or finger $p$, and above the controller I have located a stand $p'$, having a cam-shaped depending end $p^2$. On the fulcrum $g^{10}$ I have mounted a lever $p^3$, the front inner side of which next to the cutter-carrier is beveled, (see Fig. 14,) while the opposite or left-hand end of the said lever $p^3$ has jointed to it a finger $p^4$, which is acted upon by a spring $p^5$, said spring normally pressing the said pivoted finger $p^4$ toward the inclined face of the projection $p^2$ and holding the said finger above or in line of movement with the rigid finger $p$.

We will suppose that a buttonhole is about to be started, the first stitching being the barring of one end, and in such condition the secondary needle will be lifted, as in Fig. 1, and the pivoted finger $p^4$ will lie in contact with one side of the rigid finger $p$ and the dog $o'$ will be in its inoperative position. When the bar at the commencing end of the buttonhole is finished, the fulcrum $m^8$ will be lowered from its position, Fig. 1, and at the same time the coupling will be thrown in to unite the secondary and main needle bars and the throw of the work-holder will be shortened, so that each needle works simultaneously on opposite sides of what is to be the buttonhole-slit, and as the work-holder is moved longitudinally both sides of the center line of the buttonhole will receive overedge and depth stitches. As the stitching arrives at the end of the depth and overedge stitches for the sides of the buttonhole and preparatory to making the second or final bar the buttonhole-slit may be cut, and to effect this I have, as herein shown, provided the fulcrum-controller $e^3$ with a finger $p$, said finger during the depth-stitching occupying a position below the end of the movable finger $p^4$ of the lever $p^3$, and the roller or other stud $e^9$ will at such time occupy a position in the part 50 of the groove $e^{10}$. Just about as the last of the depth and overedge stitches is to be made and by the descent of both needle-bars the cam-rise 51 acts upon said roller-stud and effects the partial rise of the fulcrum-controller, causing the rigid finger $p$ to act against the end $p^4$ of the lever $p^3$, depressing the right-hand end of said lever, (see Fig. 1,) so that it immediately acts to push the dog $o'$ to the right, Fig. 14, so that as the main needle-bar, with the secondary needle-bar, again descends a projection $r$, extended from said needle-bar, will catch the pin $o^\times$ of said dog and will effect the descent of the cutter-carrier and cutter to cut the buttonhole-slit, and after this last descent of the two needle-bars in unison the part 52 of the cam $e^{10}$ acts on the said roller-stud and further lifts the fulcrum-controller $e^3$, such further movement moving the lever $g^9$ far enough to effect the uncoupling of the secondary needle-bar from the main needle-bar at the upstroke of the said needle-bars following the cutting of the buttonhole-slit, the said final upward movement of the said fulcrum-controller also causing the finger $p$, operating against the pivoted finger $p^4$, to force it against a suitable stationary incline $p^2$, so as to force said pivoted finger $p^4$ aside from contact with the finger $p$ by the time that the uncoupling of the needle-bars has been effected. The instant that the pivoted finger $p^4$ is pushed off from the finger $p$ the spring $p^7$ (see Fig. 1) acts to remove the inclined right-hand end of the lever $p^3$ from the dog, letting it be acted upon by its spring to put the pin $o^×$ of said dog out of the range of movement of said projection $r$.

In practice the cutter will be arranged as closely as possible to the main needle $a^2$ and the machine will be so timed that the cutter will descend only when the main needle descends nearest to the point where the cut is to be made. The two needle-bars having been uncoupled, the roller or other stud will ride on the cam-ledge 52 while the bar to finish the end of the buttonhole is being made, and the machine will be stopped with the roller-stud yet on said ledge 52, so that, when again started, the material having been changed, a starting-bar may be made. While the barring is being done, as stated, the end of the pivoted finger $p^4$ will stand at one side of the finger $p$; but when the said finger again descends to effect the recoupling of the two needle-bars for the depth-stitch along what is to be the two edges of the buttonhole then the finger $p$ is pulled down below the finger $p^4$, letting the spring $p^5$ act to again put the finger $p^4$ in position above the finger $p$ to be again acted upon by the rising finger when the slit is to be cut and the second bar to be made, as has been described.

Fig. 1 shows the finger $p^4$ in the position it will occupy after the cutter has been operated and while the barring is being done with only the main needle.

It will be remembered that the barring-stitches will be about eight in number and that four of these bar-stitches may make the second or final bar, when the machine will be automatically stopped with the secondary needle in its inoperative position, and the new buttonhole will be started and barred while the secondary needle is out of operative position, permitting the remaining—say four—stitches to be used for the commencement of the bar for a second buttonhole.

Believing myself to be the first to employ in a sewing-machine for making buttonholes two needle-bars each having its own needle and so control the movement of said bars that both of them may be used together for depth and overedge stitching and one of them only for barring, I desire to have it understood that this invention is not limited to the specific automatic means herein shown for coupling together the said two needle-bars in order that they may be moved in unison or for uncoupling one of said bars from the main needle-bar and locking it in its inoperative position, for it will be obvious to one skilled in the art that many devices might be devised for effecting this coupling and locking of the said secondary needle-bar from or with relation to the main needle-bar without the employment of invention, using only the skill of the mechanic, and so also I have shown one particular means for automatically and instantly varying the throw of the work-holder to follow the depth and overedge stitching, so that the overedge and depth stitches may be longer or shorter for barring. I desire it to be understood that this invention is not limited to the exact means herein shown for effecting this variation in stroke of the work-holder, for various devices might also be devised for effecting this change automatically at predetermined times with the exercise of only mechanical and not inventive skill. Nor is this invention limited to the exact shape, form, and construction of the work-holder, and it will be obvious that I may take other well-known forms of work-holders now commonly used in connection with sewing-machines and by suitable means impart to such work-holder the movement herein described and considered necessary for the production of a buttonhole in the manner which I have described.

The machine herein described, it being adapted to finish a buttonhole at each longitudinal movement of the work-holder, the last work done on a buttonhole being the making of the second bar for the hole, must be stopped and started automatically.

As I have hereinbefore stated, I find that about eight stitches of the cycle of the machine are sufficient to make both bars, and I utilize four of these stitches for the first bar, leaving four for the second bar. By making the needle-bars so that one may be temporarily put into its inoperative position, leaving the other needle-bar and its needle to make the barring-stitches, it is possible to do this, the needle bar and needle employed for barring being the only one in operative position when the buttonhole is commenced and it being the only one in inoperative position when the buttonhole is finished by its second bar.

It will of course be understood that I may readily adapt the machine so that I may take any number of stitches other than eight, if desired, for barring.

The shaft $m$ has mounted loosely on it a belt-pulley $u$, driven by a belt from any usual driving source. (Not shown.) This pulley has a projecting flange $u'$ and the outer side of the pulley is cut to leave a cam-ledge $u^2$, the inner edge of said cam-ledge being the outer edge of a ring $u^3$, (shown best in Fig. 18,) the said cam-ring being loosely mounted on the hub of said pulley $u$, the said ring being held in position on said hub in a yielding manner, however, by a spring $u^4$, mounted in a recess on the inner face of said pulley, said spring resting at one end at the end of said recess, the other end of the spring acting on a pin $u^5$, extended from the cam-ring through a slot in the said pulley. At the outer side of this loose pulley and on the shaft $m$ I have fixed by a suitable key or otherwise a hub $u^6$, having a shoulder $u^{6\times}$, said hub having pivoted upon it at $u^7$ a clutch-lever $u^8$, said lever having extended from one side of it at its inner end a toe $u^9$, said toe entering the space between the cam-ledge and the cam-ring $u^3$, a spring $u^{3\times}$, connected with said hub (see Fig. 19) and with said clutch-lever normally acting to keep said toe seated on the cam portion of the cam-ring, and when said toe is so seated on the cam portion of said ring the rotation of the pulley acting through the clutch-lever causes the clutch to be carried about with the main shaft, and said clutch, pivoted on the hub fast on the shaft, carries the main shaft with it. The outer end of the clutch-lever $u^8$ is extended far enough so that it may at the desired times be acted upon by a projection $u^{10}$ of a lever $u^{12}$, fast on a rock-shaft $u^{13}$. The lever $u^{12}$ receives in its side a screw $u^{14}$, which is surrounded loosely by an eccentric sleeve $u^{15}$, and the said eccentric sleeve is surrounded by one end of a pawl $u^{16}$, said pawl being acted upon by a spring $u^{17}$, which normally keeps the free end of said pawl pressed against the hub $u^6$.

The parts hereinbefore referred to of the stop-motion mechanism are substantially the same as shown in United States Patent No. 367,063, dated July 26, 1877, so need not herein be further described. I have added to these parts the following devices: To the rock-shaft $u^{13}$ I have added an arm $u^{18}$, acted upon by a spring $u^{19}$, said spring serving normally when permitted to act to turn the lever $u^{12}$ and put the projection $u^{10}$ in the range of movement of the outer end of the clutch-lever $u^8$ to stop the machine, and as soon as said projection engages said clutch-lever $u^8$, which is done at a predetermined position in the rotation of the machine, the hub $u^6$, owing to the strains upon it, is given a slight retrograde movement sufficient to bring its shoulder $u^{6\times}$ against the pawl $u^{16}$, said pawl serving to arrest the movement of the shaft $m$ at a predetermined position. The shaft $u^{13}$ is also provided with an arm $w$, upon which I have pivoted at $w'$ a controlling-latch $w^2$, said latch being notched to present a shoulder $w^3$ and having also a cam $w^4$, the lower end of said controlling-latch being united by a pin-and-slot connection with the end of an arm $w^5$, connected with a rock-shaft $w^6$, said rock-shaft having a second arm $w^7$, having attached to it a rod $w^8$, in turn connected with any usual lever or device under the control of, preferably, the leg of an operator, so that said operator may by turning said rock-shaft $w^6$ in the direction of the arrow near it in Fig. 17 depress said controlling-latch and remove the projection $u^{10}$ from the clutch-lever, such movement immediately freeing the clutch-lever, so that it automatically effects immediately the starting of the shaft in unison with the constantly-running belt-pulley.

As the machine is started, as described, the controlling-latch as it is depressed puts the shoulder $w^3$ thereof through the action of the spring $w^9$ under and so as to engage a stud $w^{10}$, projecting from a suitable bracket $w^{10\times}$, fixed to the head of the machine, as herein shown, by suitable screws $w^{11}$.

The controlling-cam $e^{12}$, hereinbefore fully described, has a projection $w^{12}$, which is so located with relation to said controlling-cam that, when four of the barring-stitches have been made, it will strike the cam $w^4$ of the controlling-latch and will immediately push it laterally, so as to free said latch from the projection $w^{10}$, letting the spring $u^{19}$ immediately assume control of the rock-shaft $u^{13}$ and put the projection $u^{10}$ in position to engage the clutch-lever $u^8$ and effect the stopping of the shaft $m$ as the main needle-bar $a$, containing the barring-needle, arrives in its elevated position ready to make, say, the fifth descent, of the selected number of barring-stitches, hereinbefore referred to as eight.

The machine will be held stopped while the operator removes the material containing the finished buttonhole from the workholder and supply in its place other material to be stitched for a buttonhole, and in this condition it will be remembered that only the main needle-bar, having the needle to make the barring-stitch, occupies its elevated position, and the secondary needle-bar, having the secondary needle and employed only when the depth and overedge stitches are being made along the sides of the buttonhole, is then in its inoperative position. Now when the machine is again started by the operator turning the rock-shaft $u^{13}$, as before described, the first stitch made will be, say, the fifth of the barring-stitches, and it will commence the barring for the end of a buttonhole next to be made, and as soon as the said remaining four stitches have been made to produce this first bar then the secondary needle-bar is unlocked and coupled with the main needle-bar, while the depth-stitches are being made back from the edge of what is to be the buttonhole-slit.

The stop-motion devices herein referred to are simple and sufficient; but this invention is not to be limited in all instances to the employment of exactly the stop-motion mechanism hereinbefore referred to, as instead I may employ any other or usual suitable stop-motion mechanism containing a clutch which may be automatically controlled to start and stop the machine on a defined stitch.

Having described my invention, what I claim as new, and desire to secure by Letters Patent, is—

1. In a sewing-machine, two independent needle-bars each provided with an eye-pointed needle, and means to reciprocate said needle-bars in unison, combined with means to automatically stop the operation of one of said needle-bars while the other of said bars continues to operate, substantially as described.

2. In a sewing-machine, a main and a secondary needle-bar, each provided with an eye-pointed needle, means to reciprocate said main needle-bar, a coupling device to couple said needle-bars together that the positively-moved main bar may reciprocate the secondary bar with it, combined with means to automatically uncouple the said secondary needle-bar from the main bar, substantially as described.

3. In a sewing-machine, a main and a secondary needle-bar each provided with an eye-pointed needle, means to reciprocate said main needle-bar, a coupling device to couple said needle-bars together that the positively-moved main bar may reciprocate the secondary bar with it, combined with means to automatically uncouple the said secondary needle-bar from the main bar, and suspend the operation of said secondary needle while the main bar and its needle continue in operation, substantially as described.

4. In a sewing-machine, a main and a secondary needle-bar each provided with an eye-pointed needle, means to reciprocate said main needle-bar, a coupling device to couple said needle-bars together that the positively-moved main bar may reciprocate the secondary bar with it, combined with means to automatically uncouple the said secondary needle-bar from the main bar, and with means to lock and hold stationary the said uncoupled secondary bar while the movement of the main bar is continued, for the purpose set forth.

5. In a sewing-machine, a main and secondary needle-bar, one guided by the other, each provided with an eye-pointed needle, means to reciprocate said main needle-bar, a coupling device to couple said needle-bars together that the positively-moved main bar may reciprocate the secondary bar with it, combined with means to automatically uncouple the said secondary needle-bar from the main bar, substantially as described.

6. In a sewing-machine, the following instrumentalities, viz: a stitch-forming mechanism, comprehending two needle-bars each provided with an eye-pointed needle, and complementary under-thread-carrying devices; a work-holder; means to effect automatically a relative change of position of said work-holder and stitch-forming mechanism to enable two parallel lines of depth and overedge stitches to be made simultaneously along the line of cut for the buttonhole, and means to automatically stop the operation of one of said needle-bars and its needle while the other of said bars with its needle continues in operation to form a bar, substantially as described.

7. Two under-thread-carrying devices, a main and a secondary needle-bar, each provided with an eye-pointed thread-carrying needle, means to reciprocate said main needle-bar, and a coupling to couple said secondary and main needle-bars together, a work-holder, and means to change the relative positions of said work-holder, and needles and under-thread carriers, whereby two parallel lines of depth and overedge stitches may be stitched simultaneously at opposite sides of the line of cut for a buttonhole, and means to automatically stop the operation of one of said needle-bars and its needle while the other of said bars with its needle continues in operation to form a bar, substantially as described.

8. Two under-thread-carrying devices, a main and a secondary needle-bar each provided with an eye-pointed thread-carrying needle, means to reciprocate said main needle-bar, and a movable coupling to couple said secondary and main needle-bars together, a work-holder, means to move said work-holder both in the direction of the length of the buttonhole, and in the direction transverse to the length of said hole for the production of alternate depth and overedge stitches, means to automatically uncouple said secondary needle-bar from said main needle-bar and then to lock said secondary bar stationary while the main bar continues to be reciprocated, and means to automatically increase the length of the transverse movement of said work-holder for barring while only the main needle-bar and its needle is operating, substantially as described.

9. In a sewing-machine, the following instrumentalities, viz: stitch-forming devices comprehending two needle-bars, each provided with an eye-pointed needle, and two under-thread carriers; a work-holder to clamp the material to be stitched, means to change the relative positions of said work-holder and stitch-forming mechanism to insure the production of two parallel rows of depth and overedge stitches to form the finish for the edges of a buttonhole, means to temporarily put out of operation one of said needle-bars and its needle, and means to at such time increase the relative change of position of said work-holder and stitch-forming mechanism, whereby with the one needle-bar and needle then in operation a series of stitches may be made transversely of the direction of the length of the buttonhole but longer for barring, substantially as described.

10. In a sewing-machine the following instrumentalities, viz: a main and a secondary needle-bar, each provided with an eye-pointed needle, means to reciprocate said main needle-bar, a movable coupling to couple said needle-bars together so that the main needle-bar may reciprocate said secondary needle-bar with it, a locking device to lock and hold said secondary needle-bar in its inoperative position when uncoupled from said main needle-bar, a work-holder to clamp the material to be stitched, means to move said workholder longitudinally in the direction of the length of the buttonhole to be stitched, means to move said work-holder transversely with relation to the length of said buttonhole, means to automatically actuate said coupling device to uncouple and to couple said needle-bar and to operate the lock for holding the uncoupled bar stationary in its inoperative position, means to effect the length of the transverse throw of said work-holder, a cam, and operating devices therefor, whereby said cam may in its movement effect first the uncoupling of said secondary needle-bar and its locking, and the increased throw of said work-holder for barring, then to couple said secondary needle-bar with said main needle-bar and decrease for a period the transverse throw of said work-holder for the depth and overedge stitches at the sides of the buttonhole, and to then again uncouple said secondary needle-bar, lock it in its inoperative position and increase the transverse throw of the work-holder to bar the second end of the buttonhole, the buttonhole so stitched at one longitudinal movement of the work-holder presenting two lines of depth and overedge stitches one at each side of the buttonhole-slit, and bar-stitches at both ends of said two lines of depth and overedge stitches, substantially as described.

11. In a sewing-machine the following instrumentalities, viz: two independent needle-bars, each provided with an eye-pointed needle, means to reciprocate said needle-bars in unison to make the depth and overedge stitches simultaneously for the opposite edges of a buttonhole, means to automatically stop the operation of one of said needle-bars while the other of said bars continues to operate for barring a buttonhole, a work-holder to hold the material being stitched, a buttonhole-cutting device and means to operate it to cut a buttonhole-slit in the work held in the work-clamp, substantially as described.

12. In a sewing-machine, a work-holder to hold the material to be stitched, two needle-bars each provided with an eye-pointed needle, complementary stitch-forming devices coöperating with said needles to form stitches, a cutter-carrier, a cutter carried thereby, and connections between the said work-holder and said cutter to cause the cutter to follow the work-holder in its longitudinal movements, substantially as described.

13. In a sewing-machine, a work-holder to hold the work to be stitched, two needle-bars each provided with an eye-pointed needle, a cutter located in a slot in said needle-bars between the shanks of said needles, a cutter-bar carrier to sustain said cutter, and connections between said work-holder and cutter to cause said cutter to travel through the space between said needles from one to the other side of said needles with the work-holder, to operate substantially as described.

14. In a sewing-machine, a work-holder, a movable fulcrum, a lever surrounding said fulcrum and connected with said work-holder, means to move said lever, a pawl, means operated by it to effect the step-by-step longitudinal movement of said work-holder, and intermediate means between said fulcrum and said pawl to automatically suspend the operation of said pawl when the said fulcrum is moved to increase the lateral throw of the work-holder for barring the end of a buttonhole, substantially as described.

15. In a sewing-machine for stitching buttonholes the following instrumentalities, viz: a stitch-forming mechanism comprehending two needle-bars each provided with an eye-pointed needle, and complementary under-thread-carrying devices; a work-holder; means to effect automatically a relative change of position of said work-holder and stitch-forming mechanism to enable two parallel lines of depth and overedge stitches to be made simultaneously along the line of cut of the buttonhole, means to cause said two needle-bars to reciprocate in unison for stitching the sides of a buttonhole; means to lock one of said needle-bars in its inoperative position during barring; stopping mechanism; and means to control the same whereby when a second line of barring has been made to finish the second end of a buttonhole; said machine will be stopped with the main or barring needle elevated, and mechanism, under the control of the operator, to operate said stopping mechanism to start the machine when a succeeding buttonhole is to be made, the main needle-bar containing the needle for barring being in its elevated position when the machine is started to thereby enable it working alone to commence the first bar for the buttonhole, substantially as described.

16. In a sewing-machine for stitching buttonholes the following instrumentalities, viz: stitch-forming mechanism comprehending two needle-bars each provided with an eye-pointed needle, and complementary under-thread-carrying devices; a work-holder; means to effect automatically a relative change of position of said work-holder and stitch-forming mechanism to enable two parallel lines of depth and overedge stitches to be made simultaneously along the line of cut of the buttonhole, a coupling uniting said two needle-bars for depth and overedge stitching, means to uncouple said needle-bars and lock one of them in its inoperative position during barring, stopping mechanism, and means to control the same whereby when the second line of barring made, it finishing the second end of a buttonhole, is finished, said machine will be stopped with the main or barring needle elevated, and mechanism, under the control of the operator, to operate said stopping mechanism to start the machine when the succeeding buttonhole is to be made, the main needle-bar containing the needle for barring being in its elevated position when the machine is started to thereby enable it working alone to commence the first bar for the buttonhole, buttonhole-cutting mechanism, and means to operate it at the termination of the depth and overedge stitches and preparatory to making the second bar, substantially as described.

In testimony whereof I have signed my name to this specification in the presence of two subscribing witnesses.

WILLIAM W. DIXON.

Witnesses:
 EDWARD F. ALLEN,
 MARGARET A. DUNN.